Patented Oct. 20, 1953

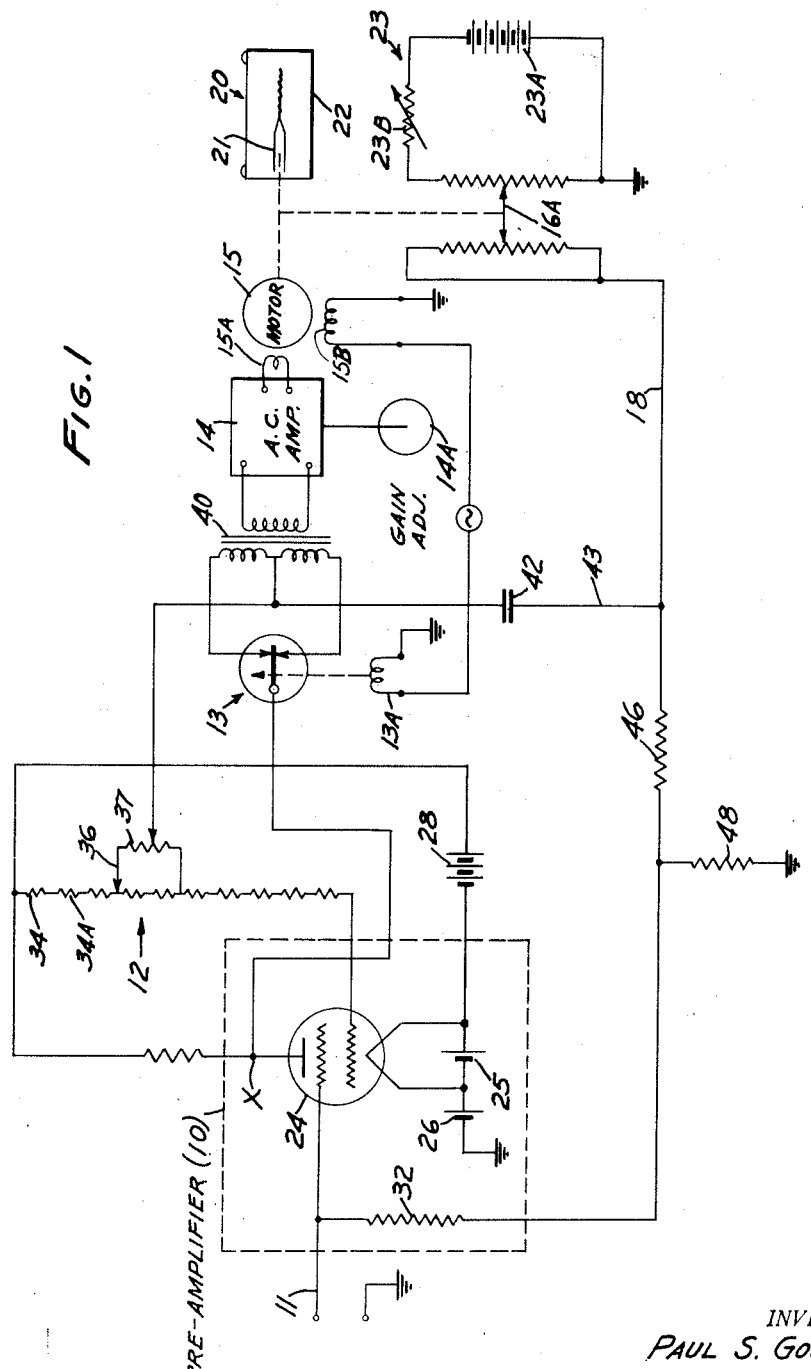

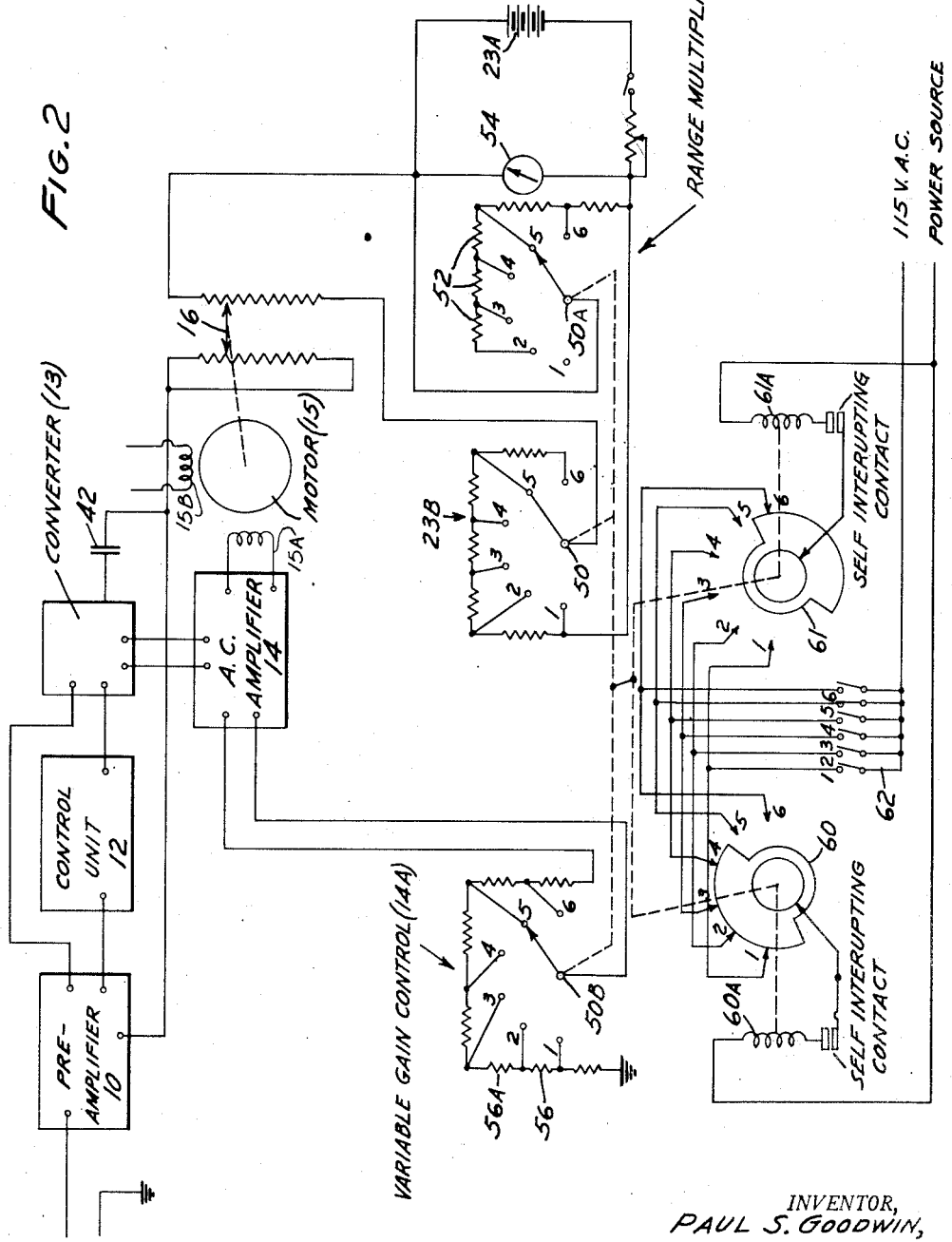

2,656,499

UNITED STATES PATENT OFFICE 2,656,499

ELECTROMETER AMPLIFIER NETWORK

Paul S. Goodwin, Pasadena, Calif., assignor to Consolidated Engineering Corporation, Pasadena, Calif., a corporation of California Application October 10, 1949, Serial No. 120,437

12 Claims. (Cl. 318—28)

This invention relates to an amplifier recorder for the measurement of minute electrical currents of the order of magnitude of approximately $10^{-9}$ amperes to $10^{-15}$ amperes. The measurement of such small currents is necessary in the practice of mass spectrometry to measure the current received by the ion collector, in the operation of radiation detectors, and in many other fields. This is a continuation-in-part of my co-pending United States patent application Serial No. 82,337, filed March 19, 1949, and describes improvements in the amplifier recorder disclosed therein.

Most commercially available recorders do not lend themselves readily to the recording of minute currents because of their relatively low input impedance. Several circuits have been developed and described in the literature which combine high impedance D. C. amplifiers or A. C. electrometers with such low impedance recorders. However, these circuits are generally quite complex and hence expensive to construct. In my aforementioned co-pending application there is illustrated a simple circuit for the measurement of small currents on the order of $10^{-8}$ amperes or less, which compares very favorably in performance with the more complicated arrangements.

Throughout the specification and claims, the term "D. C. amplifier" is used to designate a resistance-coupled vacuum tube amplifier and the term "A. C. amplifier" is used to designate a reactance-coupled vacuum tube amplifier.

The circuit described and illustrated in said co-pending application comprises a pre-amplifier network feeding a recorder amplifier, a balancing network associated with the pre-amplifier to balance the output when there is no input signal, and a range multiplying network connected to permit variation of recorder sensitivity in accordance with the magnitude of the received signal. The range multiplying network may be controlled manually or automatically, as desired.

The entire system is a null network; i. e. the output of the A. C. amplifier drives a motor which in turn varies the setting of a slidewire potentiometer to feed a balancing voltage into the input of the pre-amplifier. The range multiplying network is connected across the potentiometer and provides means for varying, preferably in increments, the voltage impressed across the potentometer. In this manner, maximum sensitivity of the potentiometer, i. e. maximum slider deflection, to relative changes in the input signal may be achieved by varying the full scale voltage of the potentiometer. A recording pen is mechanically linked to the motor or to the slider of the potentiometer to record the excursions of the slider and thus the relative magnitude of the input signal.

Since this system is a closed loop or null balanced network, it, in common with all feedback circuits, is subject to oscillation or under-damping unless means are provided to overcome such a tendency. This tendency is especially apparent where, as in the present case, the system includes an electrical-mechanical transducer. The mass of moving elements as for example, the motor, potentiometer slider, and recording pen, require application of a force to overcome the increased inertia developed by these elements. To damp the system there must be fed into the circuit a voltage proportional to slidewire velocity and of such polarity that the damping signal tends to decelerate the motor and its load. Damping was accomplished in the circuit illustrated in my co-pending application by connecting the feed-back loop of the circuit through a so-called damping capacitor to the input of the A. C. amplifier; in this particular case, to a chopper mechanism preceding the amplifier. This disposition of the damping capacitor, rather than the more obvious placement in association with the control grid of the pre-amplifier tube, has the advantages of applying the damping voltage to a relatively high gain portion of the circuit and at the same time avoiding the high impedance pre-amplifier.

The present invention is directed in part to improvements in the means for damping the circuit relating primarily to more effective damping without consequent reduction of band width. I have found that the shunting capacity of the pre-amplifier tube, i. e. the control grid to ground capacity, results in a condition of under-damping. This under-damping cannot, in all cases, be corrected by the simple expedient of increasing the capacity of the damping capacitor since a limit is reached where increased damping produces a reduction in band width, i. e. slower speed of response. I have now found, however, that by reducing the value of the grid leak resistor in the pre-amplifier, say by a factor of three, and incorporating a compensatory resistance divider in the feed-back loop between the damping capacitor and grid leak resistor, a larger damping voltage can be injected into the system for a given capacity of the damping capacitor. The mechanism of this damping network will be described in greater detail.

As disclosed above and as illustrated in my co-pending application, the range multiplying network and conjunctively the gain of the A. C. amplifier may be controlled automatically responsive to the magnitude of the input signal. Alternatively and perhaps in a preferred system, a switching circuit is provided wherein a single switch or group of switches, either manually or automatically controlled, can be made to adjust the range multiplying network, i. e. the magnitude of the voltage impressed across the slidewire potentiometer, and at the same time, the gain of the A. C. amplifier. Such a switching circuit is shown in said co-pending application and comprises a uni-directional solenoid homing switch. With a switch of this type a range change from any less sensitive range to the most sensitive range requires that the switching take place by proceeding to the least sensitive range and through it one step to the most sensitive range. This abrupt change between the two extremes of sensitivity creates transient disturbances that tend to "block" both the D. C. and A. C. amplifiers for a sufficiently long period of time to obscure incoming signal information. I have now developed a double-acting, duo-solenoid homing mechanism with bi-directional drive. With this system, switching between the various sensitivity ranges is accomplished by going through only intermediate values of sensitivity, and not through any values either higher or lower than the starting or stopping values. Hence it is impossible to jump directly from the less sensitive to the most sensitive ranges and as a consequence unduly large transient disturbances are avoided.

The invention will be more clearly understood from the following detailed description taken in conjunction with the accompanying drawing in which:

Fig. 1 is a circuit diagram of a simplified network in accordance with the invention; and Fig. 2 is a simplified diagram of the circuit of Fig. 1 including means for synchronously varying the sensitivity range and A. C. amplifier gain.

The apparatus illustrated in the diagram of Fig. 1 includes a pre-amplifier 10 which receives an input signal through lead 11. The pre-amplifier is coupled to a pre-amplifier control unit 12 by means of which the pre-amplifier is balanced to zero output when there is no input signal at 11. The pre-amplifier control unit is in turn, coupled to an A. C. amplifier 14 through a converter 13. The output of amplifier 14 is fed into one winding 15A of an induction motor 15. The motor is mechanically coupled to a slidewire potentiometer 16 and is actuated by the A. C. amplifier in phase with the converter to adjust the slider of the potentiometer to a point where the voltage impressed on a lead 18 connecting the potentiometer and the pre-amplifier balances the input signal voltage. A recording mechanism 20 includes a pen 21 mechanically linked to the potentiometer slider to record on a chart 22 the excursions of slider 16A. A range multiplier network 23 is connected across potentiometer 16 and permits range adjustment as hereinafter described.

Pre-amplifier 10 includes a vacuum tube 24 connected, in what is known in the art, as a space-charge grid connection, i. e. in such fashion that the grid closest the anode constitutes the control grid. The tube 24 is supplied by filament voltage source 25 in conjunction with a bias battery 26. Plate voltage and space-charge grid voltage are supplied by battery 28. A signal current to be measured is received through lead 11, developing a voltage as it flows through an input grid leak resistor 32 having an impedance in the order of approximately 10,000 megohms. The corresponding grid-leak resistor of the circuit described in my co-pending application has an impedance approximately three times that of the present resistor. This three-fold difference in resistor impedance is a significant modification of the first described circuit and functions in conjunction with the other elements of the present circuit in the manner hereinafter described to produce improved damping. The voltage developed across grid-leak resistor 32 causes the control grid of tube 24 to swing slightly positive, increasing the plate current and causing the plate voltage to become more negative.

The quiescent value of the plate voltage at point X when there is no input signal at 11 is balanced against the voltage appearing in the pre-amplifier control unit 12 which functions as a zero set network. The balancing network 12 has been described in detail in the aforementioned co-pending application and includes a plurality of series resistors 34, 34A, etc., connected between the space-charge grid and the plate voltage supply 28 of tube 24 and a selector switch 36. A helical potentiometer 37 is connected between switch 36 and converter 13 and is connected in the circuit between appropriate ones of the resistors by the switch. The signal voltage developed at the point X is impressed on the converter or chopper 13 which converts the D. C. voltage to an A. C. component. This A. C. variation is fed through a transformer 40 to the A. C. amplifier 14. The output of the helical potentiometer 37 is also applied to transformer 40 to balance out any output of converter 15 when there is no input signal at 11, i. e. to balance out any background signal which would otherwise affect the input signal.

The output of the A. C. amplifier 14 is applied across one coil 15A of the two coil motor 15, the other coil 15B of the motor being excited by the same carrier frequency applied to coil 13A of the converter 13. Since the coils 15A, 15B of the motor are in quadrature, only those impulses impressed on coil 15A, which are 90° out of phase with the carrier current impressed on coil 15B, will cause the motor to rotate. Hence, there exists at the output a shaft rotation of motor 15 which is proportional only to the D. C. voltage appearing across the grid-leak resistor 32 and which is insensitive to any extraneously developed signals.

As mentioned in my co-pending application, the amplifier-motor combination may presently be obtained commercially as an integral unit. There is nothing critical about the design of the amplifier 14 except that it should have sufficient gain and preferably be provided with a variable gain control 14A, compensatory to the adjustment of the full-scale sensitivity of the potentiometer 16.

Potentiometer 16 may be of any type but is conveniently a slidewire potentiometer. The resistance card of the potentiometer has a voltage impressed across it from a D. C. source, in this particular embodiment, a battery 23A. The voltage impressed across the slidewire resistance card determines the full-scale sensitivity of the recorded signal. By inclusion of a variable resistor 23B in series between the source 23A and the potentiometer the full scale voltage of the potentiometer may be adjusted between a pre-selected minimum value and the maximum voltage output of the source 23A. By changing the full-scale voltage of the potentiometer resistance card, maximum sensitivity for a given signal magnitude may be obtained.

The system is a null balance network with the input voltage to the grid of tube 24 being equal and opposite to the feed-back voltage impressed on the grid-leak resistor within predetermined errors. The arm 16A of potentiometer 16 is mechanically linked to the pen 21 of recorder 20 and is connected through feed-back lead 18 to the grid-leak resistor 32. Any disturbance such as a signal current flowing through the resistor 32 is amplified throughout the system causing the motor 15 to move the slider 16A of potentiometer 16, and simultaneously the recording pen 21, so as to bring the voltage of the control grid of tube 24 back to ground potential, this being the reference potential of the system.

To this extent the circuit of the present invention is substantially similar to that described in my aforementioned application, the only change lying in the connection of the pre-amplifier and pre-amplifier control units to the converter 13 and potentiometer 40. In essence, the polarity of this system has been reversed over that shown in the early application, there being no real difference since the net result will be the same in both cases providing that the coupling transformer between the converter and A. C. amplifier be of opposite polarity in the two systems.

As mentioned above, a system of this character must be damped to inhibit undesirable oscillation. A damping factor of considerable magnitude is required in the present circuit because of the electrical-mechanical transduction between the A. C. amplifier on the one hand and the potentiometer slider and recorder pen on the other. Damping is achieved in the circuit of the aforementioned application by interposition of a capacitor in a lead connecting the feed-back loop and the converter-amplifier network. In the present circuit, a capacitor 42 is connected in lead 43 between the feed-back lead 18 and the coupling transformer 40 in the same manner. However, there is an upper limit to the capacitance of this damping capacitor evidenced by an undesirable reduction of band width. Hence some means of increasing the damping voltage without limiting the band width by an undue increase of the capacitance of the damping capacitor is desirable.

I have accomplished this in the present circuit by making two cooperating modifications in the circuit as originally described in said co-pending application. A grid leak resistor of a considerably lower impedance is substituted for the high impedance grid lead resistor originally employed. For example, resistor 32 in the circuit of Fig. 1 may have an impedance of approximately $10^{10}$ ohms as compared to an impedance of approximately three times this value for the corresponding resistor in the original circuit. A resistance divider including a series resistor 46 and a grounded resistor 48 is included in the feed-back lead 18 to reduce the voltage applied from the potentiometer at the grid lead resistor by a corresponding factor. The proportionality factor of 3 represents an arbitrary selection. Resistor 32 may have ½, ¼, ⅕, etc., the impedance of the corresponding resistor in the circuit shown in my co-pending application, provided only that a resistance divider of a like factor is incorporated in the feed-back loop.

The mechanism of damping with this system is as follows:

The input time constant is reduced by a factor of 3 by the three-fold reduction of the impedance of the grid-leak resistor, thus reducing the tendency toward under-damping. The D. C. feed-back voltage to the grid-leak resistor is also reduced by a factor of 3 by the resistance divider so as to maintain the scale calibration on the recorder. However, since the slidewire voltage is not altered and the voltage division in the feed-back loop is between the damping capacitor and the grid-leak resistor, a velocity damping voltage three times as great can be injected into the loop for the same capacitance of the damping capacitor. Although the signal-to-noise ratio is decreased slightly as a consequence of the reduction of the input impedance, the large increase in damping and the ability to withstand greater input capacity more than offsets the sacrifice of signal-to-noise ratio.

In Fig. 2, essentially the same circuit is shown, partially in block diagram and provided with switching mechanism for simultaneously and correspondingly varying the voltage across the slide wire potentiometer and the gain of the A. C. amplifier. The switching system shown in my co-pending application comprises a conventional unidirectional solenoid homing switch. With this switch any change in range from a less sensitive to a more sensitive condition proceeded through the least sensitive range, jumping in a single step from the least sensitive range to the most sensitive range. The improved switching system shown in Fig. 2 greatly reduces transient disturbances by switching from one sensitivity range to another sensitivity range through only the intermediate values of sensitivity.

The circuit shown in Fig. 2 includes the pre-amplifier 10, control unit 12, converter 13, A. C. amplifier 14, motor 15, slidewire potentiometer 16, range multiplier 23 and the amplifier variable gain control 14A. The range multiplier 23 includes the D. C. source 23A and the variable resistance network 23B controlled by selector switch 50. A companion selector switch 50A controls a series of shunt resistors 52 connected across the source to provide constant drain on the source 23A as evidenced by a reading of meter 54 connected across the source. Variable gain control network 14A of the amplifier 14 includes a series of resistors 56, 56A, etc., and a selector switch 50B.

The selector switches 50, 50A, 50B are operated synchronously by the homing switches 60, 61. The homing switches 60, 61 are in turn controlled by a plurality of control switches 62 which may be either manually or automatically controlled.

Each of the selector switches 50, 50A, 50B, each of the homing switches 60, 61 and the switch bank 62 include six positions correspondingly numbered in the drawing. The illustrated arrangement is such that when switch 5 of the bank 62 is closed, the homing switches will automatically actuate the several selector switches until they are closed at the 5 position. The corresponding positions of the selector switches are arranged so that for an increase in the voltage applied across potentiometer 16 through switch 50, the shunt resistance will increase, and the gain of amplifier 14 will be decreased.

The homing switches 60, 61 are driven respectively by solenoids 60A, 61A and are ganged, as by mounting on a common shaft, so that one will rotate in a reverse direction responsive to driven rotation of the other. The "homing" card of the two switches was specifically designed to avoid abrupt change from minimum to maximum sensitivity. In the drawing, switch 5 of bank 62 is closed and the homing switches are positioned so that the lead between the No. 5 contacts is open at both ends. In this position there is no energy supplied to either driving solenoid. Accordingly, each of selector switches 50, 50A, 50B is closed on the 5 position. If switch 3 of the bank 62 is closed and switch 5 is opened, solenoid 60A is energized through contact 3 on homing switch 60, rotating the latter past position 4 and 3 to break the contact 3. At the same time switch 61 is rotated responsive to rotation of switch 60 past the 5 and 4 positions so that position 3 will be the only position not contacting either of the switches 60, 61. In other words, the switches 60, 61 rotate either responsive to energization of their associated solenoid or responsive to rotation of the other switch to bracket the particular position corresponding to the closed switch of switch bank 62. In the procedure the selector switches are set on the corresponding position.

Although the switch bank 61 is illustrated as manually operated, it is equally feasible, and in some installations, preferable to operate the control switches automatically in accordance with a prearranged pattern or responsive to the relative magnitude of the input signal. In either event, the use of a double-acting homing mechanism materially reduces the ordinary disturbances consequent upon conventional range switching.

I claim:

1. In an amplifier for measurement of small currents, including a high input impedance low output impedance D. C. amplifier, a converter connected to convert the D. C. output of said amplifier to an A. C. variation thereof, an A. C. amplifier for amplifying the output of the converter, a motor connected to be actuated responsive to the output of said A. C. amplifier, a potentiometer having an arm adjustable by said motor, means for detecting the magnitude of the adjustment of said potentiometer arm and a feed-back loop connecting the potentiometer arm to the input of said D. C. amplifier, the improvement comprising a capacitor connected between the feed-back loop and said converter, and a voltage divider connected in said feed-back loop between said capacitor and the D. C. amplifier input.

2. Apparatus according to claim 1, wherein said voltage divider comprises a first resistor connected in series in the feed-back loop and a second resistor connected between ground and the feed-back loop at a point between the first resistor and the D. C. amplifier input.

3. In an amplifier for the measurement of small currents comprising a D. C. amplifier including an amplifier tube and an input grid leak resistor, control means for balancing the output of the D. C. amplifier to zero level when there is no input voltage developed across the grid leak resistor, a converter connected to convert the D. C. output of said D. C. amplifier to an A. C. component thereof, an A. C. amplifier for amplifying the output of the converter, a motor connected to be actuated by the A. C. amplifier, a potentiometer having an arm motivated by said motor and, a source of voltage connected across said potentiometer the improvement comprising, a feed-back lead connecting said arm and said grid leak resistor, the voltage developed at said arm being of opposite polarity than said input voltage and $x$ times the magnitude of said input voltage, a capacitor connected between said feed-back lead and said converter, and a voltage divider in said feed-back lead between the capacitor and the input resistor, said voltage divider having a factor of $1/x$.

4. In an amplifier for the measurement of small currents comprising a D. C. amplifier, control means for balancing the output of the D. C. amplifier to zero level when there is no input signal, a converter connected to convert the D. C. output of said D. C. amplifier to an A. C. component thereof, a variable gain A. C. amplifier for amplifying the output of the converter, a motor connected to be actuated responsive to the output of said A. C. amplifier, a potentiometer having an arm adjustable by said motor, a feed-back loop connecting the potentiometer arm to the input of said D. C. amplifier, and means for varying the voltage range of said potentiometer, damping means for damping the oscillations of the systems, the improvement comprising range switching means for simultaneously varying the voltage range of said potentiometer and the gain of said A. C. amplifier in fixed relation, the switching means being so arranged that any change in voltage range proceeds only through intermediate voltage values.

5. In an amplifier for the measurement of small currents comprising a D. C. amplifier, control means for balancing the output of the D. C. amplifier to zero level when there is no input signal, a converter connected to convert the D. C. amplifier, means for varying the voltage range of said potentiometer, and damping means for damping the oscillations of the system, the improvement comprising a first selector switch operable to vary the voltage range of said potentiometer, a second selector switch operable to vary the gain of said A. C. amplifier in fixed relation to the variation of said voltage range, and a homing switch operable to vary the settings of said selector switches simultaneously and only through intermediate values of voltage range and gain respectively.

6. Apparatus according to claim 5 wherein the homing switch comprises two solenoid operated contact disks mechanically linked to rotate in opposite directions, a plurality of contacts positioned to contact a part of each disk as the disks are rotated, electrical leads connecting corresponding contacts on the two disks, a source of power, means connecting the source to one side of each of said solenoids, the other side of said solenoids being electrically connected to their respective disks, a plurality of off-on switches and means connecting the source through said off-on switches to said electrical leads, the arrangement being such that when one of said off-on switches is closed current will flow through the associated lead and the one of said brushes connected by the lead which is contacting its associated disk thereby energizing the respective solenoid to cause rotation of said disk and counter rotation of the other disk to a position at which contact is broken.

7. In an amplifier for the measurement of small currents comprising a D. C. amplifier, control means for balancing the output of the D. C. amplifier to zero level when there is no input signal, a converter connected to convert the D. C. output of said D. C. amplifier to an A. C. component thereof, a variable gain A. C. amplifier for amplifying the output of the converter, a motor connected to be actuated responsive to the output of said A. C. amplifier, a potentiometer having an arm adjustable by said motor, a feed-back loop connecting the potentiometer arm to the input of said D. C. amplifier, means for varying the voltage range of said potentiometer, and a capacitor connected between the feed-back loop and said converter, the improvement comprising a voltage divider connected in the feed-back loop between said capacitor and the D. C. amplifier input, a first selector switch operable to vary the voltage range of said potentiometer, a second selector switch operable to vary the gain of said A. C. amplifier in fixed relation to the variation of said voltage range, and a homing switch operable to vary the settings of said selector switches simultaneously and only through intermediate values of voltage range and amplifier gain respectively.

8. In an amplifier for the measurement of small currents comprising a D. C. amplifier, control means for balancing the output of the D. C. amplifier to zero level when there is no input signal, a converter connected to convert the D. C. output of the D. C. amplifier to an A. C. variation thereof, a variable gain A. C. amplifier for amplifying the output of the converter, a motor connected to be actuated responsive to the output of said A. C. amplifier, a slidewire potentiometer, a source of voltage connected across said potentiometer, an electrical lead connecting the slider of said potentiometer to the input of said D. C. amplifier, and means connecting the motor and slider of said potentiometer so that the slider is adjusted responsive to actuation of said motor the improvement comprising, a first selector switch connected in series between said source and said potentiometer, a separate resistor connected between each switch point of said first switch so that the voltage applied across said potentiometer differs with each setting of the first switch, a second selector switch connected across said source, a separate resistor connected between each switch point of said second switch so that the current shunted across said second switch varies with each setting thereof, a third selector switch connected to vary the gain of said A. C. amplifier at each setting of the switch and means for setting the several selector switches simultaneously so that any change in the voltage impressed across said potentiometer is accompanied by a directly proportional change in shunt resistance through said second selector switch and in an inverse change in amplifier gain by means of said third selector switch.

9. In an amplifier for the measurement of small currents comprising a D. C. amplifier, control means for balancing the output of the D. C. amplifier to zero level when there is no input signal, a converter connected to convert the D. C. output of the D. C. amplifier to an A. C. variation thereof, a variable gain A. C. amplifier for amplifying the output of the converter, a motor connected to be actuated responsive to the output of said A. C. amplifier, a slidewire potentiometer, a source of voltage connected across said potentiometer, an electrical lead connecting the slider of said potentiometer to the input of said D. C. amplifier, and means connecting the motor and slider of said potentiometer so that the slider is adjusted responsive to actuation of said motor the improvement comprising, a first selector switch connected in series between said source and said potentiometer, a separate resistor connected between each switch point of said first switch so that the voltage applied across said potentiometer differs with each setting of the first switch, a second selector switch connected across said source, a separate resistor connected between each switch point of said second switch so that the current shunted across said second switch varies with each setting thereof, a third selector switch connected to vary the gain of said A. C. amplifier at each setting of the switch and damping means for damping the oscillations of the system.

10. Apparatus according to claim 9 wherein said damping means comprises the combination of a capacitor connected by means of electrical lead between the feed-back loop and the A. C. amplifier, and a voltage divider connected in the feed-back loop between the junction of said electrical lead and the input of said D. C. amplifier.

11. Apparatus according to claim 10 wherein the voltage at the slider of said potentiometer is of opposite polarity and $x$ times the magnitude of the input voltage to said D. C. amplifier and said voltage divider has a division factor of $1/x$.

12. In an amplifier for the measurement of small currents comprising a D. C. amplifier including an amplifier tube and an input grid leak resistor, control means for balancing the output of the D. C. amplifier to zero level when there is no input voltage developed across the grid leak resistor, a converter connected to convert the D. C. output of said D. C. amplifier to an A. C. component thereof, an A. C. amplifier for amplifying the output of the converter, a motor connected to be actuated by the A. C. amplifier, a potentiometer having an arm motivated by said motor, and a source of voltage connected across said potentiometer, the improvement comprising a feed-back lead connecting said arm and said grid leak resistor, the voltage developed at said arm being of opposite polarity and $x$ times the magnitude of said input voltage, a capacitor connected between said feed-back lead and said converter and means in said feed-back lead between the capacitor and the input resistor for reducing the voltage between said capacitor and the input resistor by a factor of $1/x$.

PAUL S. GOODWIN.

References Cited in the file of this patent

UNITED STATES PATENTS

| Number | Name | Date |
| --- | --- | --- |
| 2,520,462 | Hartung | Aug. 29, 1950 |